(12) United States Patent
Sathyanarayana et al.

(10) Patent No.: US 9,400,720 B2
(45) Date of Patent: Jul. 26, 2016

(54) FLEXIBLE HIGH AVAILABILITY DISASTER RECOVERY WITH A SET OF DATABASE SERVERS

(71) Applicants: Ramanna Sathyanarayana, San Francisco, CA (US); Jaikishan Dabhole, Pune (IN); Taghi Fatemi, Puteaux (FR); Tony Imbierski, Basingstoke (IN)

(72) Inventors: Ramanna Sathyanarayana, San Francisco, CA (US); Jaikishan Dabhole, Pune (IN); Taghi Fatemi, Puteaux (FR); Tony Imbierski, Basingstoke (IN)

(73) Assignee: Sybase, Inc., Dublin, CA (US)

( * ) Notice: Subject to any disclaimer, the term of this patent is extended or adjusted under 35 U.S.C. 154(b) by 93 days.

(21) Appl. No.: 14/256,639

(22) Filed: Apr. 18, 2014

(65) Prior Publication Data

US 2015/0301910 A1    Oct. 22, 2015

(51) Int. Cl.
*G06F 11/20* (2006.01)
*G06F 11/16* (2006.01)

(52) U.S. Cl.
CPC ........ *G06F 11/1658* (2013.01); *G06F 11/2028* (2013.01); *G06F 11/2041* (2013.01); *G06F 11/2048* (2013.01); *G06F 2201/80* (2013.01)

(58) Field of Classification Search
CPC ............ G06F 11/2082; G06F 11/2097; G06F 11/2023; G06F 11/20; G06F 11/1482; G06F 11/2041; G06F 11/14; G06F 11/2038; G06F 11/2048
See application file for complete search history.

(56) References Cited

U.S. PATENT DOCUMENTS

| | | | |
|---|---|---|---|
| 5,515,502 A | 5/1996 | Wood | |
| 5,951,695 A | 9/1999 | Kolovson | |
| 7,305,421 B2 * | 12/2007 | Cha | ..................... G06F 11/1471 |
| 7,447,710 B2 | 11/2008 | Sampath et al. | |
| 7,549,079 B2 * | 6/2009 | Connolly | ............ G06F 11/2025 714/46 |
| 7,657,718 B1 | 2/2010 | LeCrone et al. | |
| 7,933,869 B2 | 4/2011 | Becker et al. | |
| 8,027,952 B2 | 9/2011 | Kern et al. | |
| 8,103,635 B2 * | 1/2012 | Lee | ..................... G06F 11/2097 707/679 |
| 8,121,978 B2 * | 2/2012 | Wiss | ................... G06F 11/2071 707/615 |
| 8,255,369 B2 * | 8/2012 | Luo | ..................... G06F 11/1482 707/609 |
| 8,356,010 B2 | 1/2013 | Driesen | |
| 8,386,431 B2 | 2/2013 | Hahn et al. | |
| 8,417,669 B2 | 4/2013 | Xu et al. | |
| 8,442,952 B1 | 5/2013 | Armangau et al. | |
| 8,874,508 B1 * | 10/2014 | Mittal | ..................... G06F 17/00 707/610 |
| 2003/0009707 A1 * | 1/2003 | Pedone | ............... G06F 11/2041 714/6.3 |
| 2007/0124347 A1 * | 5/2007 | Vivian | ................ G06F 11/2025 |
| 2008/0091737 A1 * | 4/2008 | Lee | ..................... G06F 11/2097 |
| 2010/0088281 A1 | 4/2010 | Driesen et al. | |
| 2013/0117237 A1 | 5/2013 | Thomsen et al. | |
| 2013/0159247 A1 | 6/2013 | Engelko et al. | |
| 2013/0339533 A1 * | 12/2013 | Neerincx | .......... G06F 17/30566 709/228 |

* cited by examiner

*Primary Examiner* — Nadeem Iqbal (74) *Attorney, Agent, or Firm* — Sterne, Kessler, Goldstein & Fox PLLC (57) ABSTRACT

Seamless failover in a database replication environment which has a primary database server and a plurality of standby database servers, is described. An example method includes orderly terminating transactions on the primary database server, where the transactions are originated from client applications. The transaction logs of the primary database server are drained and the transaction logs are replicated from the primary database server to the plurality of standby database servers. One of the standby database servers is designated as a new primary database server processing user transactions.

20 Claims, 5 Drawing Sheets

FLEXIBLE HIGH AVAILABILITY DISASTER RECOVERY WITH A SET OF DATABASE SERVERS

BACKGROUND

In a distributed database environment, business applications are sometimes configured to switch to a backup database server to avoid data loss, in the event that a primary database server becomes unavailable. Further, some business applications also require near zero downtime while fail over system and software are upgraded. Some conventional fail over systems implement a rolling upgrade scheme. However, such systems typically impose a geographic requirement that the primary database server and the backup database server must be physically close to each other for the failover to occur. Further, the number of backup database servers is generally also limited in such systems. As a result, conventional systems fail to provide a high availability and disaster recovery system with flexibility and transparency.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for flexible High Availability Disaster Recovery (HADR) using a set of database servers. HADR is data replication that provides a high availability solution for both partial and complete site failures. HADR protects against data loss by replicating data changes from a source database, typically called the primary database, to a target database, generally called the standby database. HADR can include multiple database servers. As will be described in further detail below, embodiments implement a cluster of database servers, including, for example, a primary database server, one or more standby database servers, and optionally a companion database server, as well as combinations and sub-combinations thereof. A high availability cluster can include, for example, two machines that are configured so that, if one machine (or application) is brought down, the second machine assumes the workload of both machines. The machines can host one or more database servers. The database servers can manage independent workloads, and are capable of taking over each other's workload in the event of a failure.

The movement from one database server to another is called failover. Failover can include switching to a redundant computer server, system, hardware component or network upon the failure or abnormal termination of the previously active application, server, system, hardware component, or network. The database server that fails is hereinafter referred to as the primary database server. The database server that takes over the workload is hereinafter referred to as a standby database server or a companion database server. A standby database server is a database server that performs asynchronous replication with the primary database server. In asynchronous replication, each operation is started when a preceding operation is completed. A companion database server is a database server that performs synchronous replication with the primary database server. One of the standby database servers can be designated as a companion database server.

Embodiments allow new servers (e.g., database servers) to be added to the cluster as needed to meet growing requirement of the application development. In some embodiments, because the primary database server can logically communicate with the standby database servers and companion database servers anywhere in the network, some or even all servers (e.g., database servers) may reside in any geographical location. Thus, embodiments eliminate the restriction that the failover database servers (e.g., standby database server, companion database servers) have to be physically close to each other and/or to the primary database server. Accordingly, when the primary database server is deactivated and a standby database server is promoted as the new primary database server, embodiments enable a smooth failover from the primary database server being deactivated to the new primary database server.

Figure 1:
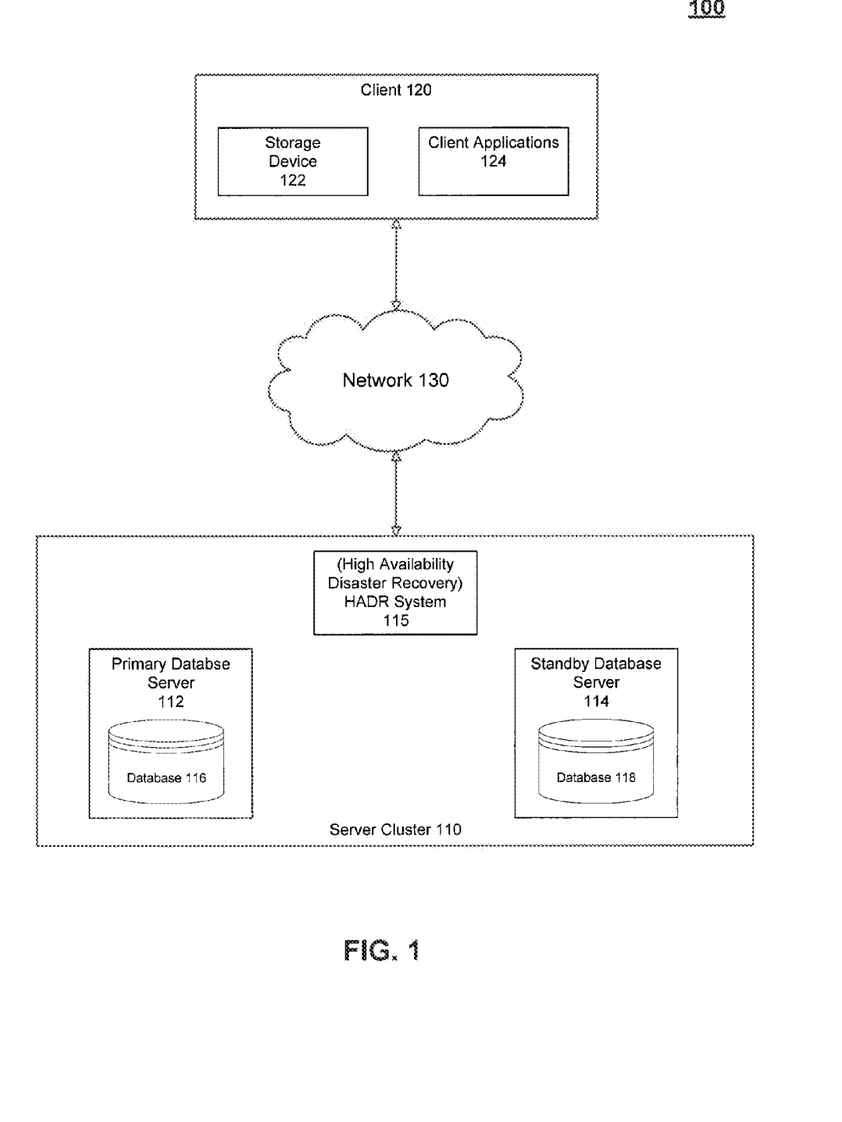
FIG. 1 illustrates a client/server system, according to an embodiment.

FIG. 1 illustrates a client/server system 100, according to one embodiment. System 100 includes a server cluster 110, a HADR system 115, a client 120, and a network 130. System 100 can include more than one client 120 and more than one server cluster 110. Client 120 communicates with server cluster 110 over the network 130. Specifically, client 120 can be coupled to a Database Management System (DBMS), which can include primary database server 112 and standby database server 114 of server cluster 110, via network 130. The primary database server 112 is coupled to a primary database (e.g., database 116). The standby database server 114 is coupled to a corresponding standby database (e.g., standby database 118). The server cluster 110 can include more than one standby database server 114. The server cluster 110 can include one or more companion database servers. The network 130 can include functionality for packaging client calls in the well-known Structured Query Language (SQL) together with any parameter information into a format (of one or more packets) suitable for transmission to the DBMS. Client 120 can send SQL statements to server cluster 110 to query the server cluster 110 and receive query results from server cluster 110. Network 130 can be any network or combination of wired and wireless networks that carry data communication. Such network can include, but is not limited to, a local area network, medium area network, and/or wide area network, such as the Internet.

Client 120 hosts one or more client applications 124. An example of a client application 124 can include, as is not limited to, a database application. A database application can be a computer program whose primary purpose is to enter and retrieve information from a computerized database and to facilitate simultaneous updates and queries from multiple client applications 124. Examples of database applications can be accounting systems and airline reservations systems.

Server cluster 110 can host HADR system 115. As illustrated in FIG. 1, client 120 can send data requests to server cluster 110, which can in turn invoke HADR system 115 for further processing. HADR system 115 affords smooth failover from a primary database to one of the standby database servers. In an embodiment, HADR system 115 is a component of primary server 112 or standby server 114. HADR system 115 can be software, firmware, or hardware or any combination thereof in a computing device. System 100 can be implemented on or implemented by one or more computing devices. As will be further described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device can include a communication port or I/O device for communicating over wired or wireless communication link(s).

System 100 can provide infrastructure for rolling upgrade of software or system with near zero data loss and down time to client application 124 without any geographic restriction of the servers (e.g., primary database server 112, standby database servers 114). In an example configuration, a primary database server may reside in London, a standby database server may reside in Paris and another standby database server in Dublin. In an embodiment, transaction processing occurs on primary database server 112, and an application server, such as client 120, intelligently connects to the current primary database server 112. In an embodiment, standby database server 114 can be in a warm state, where asynchronous replication occurs between primary database server 112 and standby database server 114.

Figure 2:
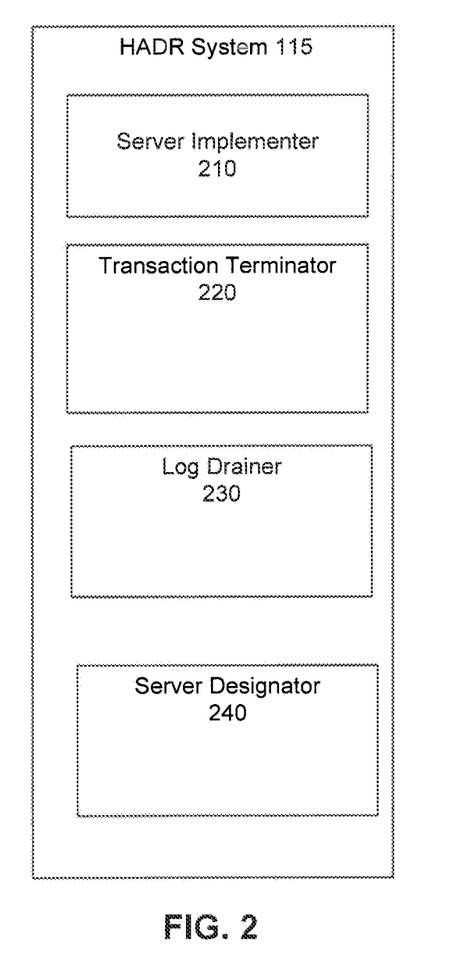
FIG. 2 illustrates elements of a High Availability Disaster Recovery (HADR) system, according to an embodiment.

FIG. 2 illustrates elements of HADR system 115, according to an embodiment. In the example shown in FIG. 2, HADR system 115 includes a server implementer 210, a transaction terminator 220, a log drainer 230 and a server designator 240. The server implementer 210, a transaction terminator 220, a log drainer 230 and a server designator 240 can reside on one or more computing devices.

Optionally, server implementer 210 configures a primary database server and one or more standby database servers in the database replication environment, based on instruction specified by an administrator.

In an embodiment, server implementer 210 may further implement one or more companion database servers. The server implementer 210 can designate one of the standby database servers as a companion database, for example, based on user (e.g., system administrator) input. The companion database server may serve in a "hot" state with regards to the primary database server, where data replication between the primary database server and the companion database server is in a synchronous mode. For example, a primary database server may be in San Francisco, while the standby database servers, which are replicating data in asynchronously, may be in San Jose, Las Vegas, and New York respectively. The standby database server in San Jose may be selected to serve as a companion database server for the primary database server in San Francisco, and may replicate data synchronously as a companion database server. Due to physical proximity of the San Jose standby database server to the San Francisco primary database server, a faster failover may occur from the primary database server to the companion database server. In an embodiment, after the primary database server fails over to the San Jose companion database server, a new companion database server, such as the standby database server in Las Vegas or New York may be selected as the new companion database server, based on the user input. It is noted embodiments are not limited to the examples described above.

In an embodiment, the primary database server, the standby database servers, and companion database servers may be on different platforms or different platform versions. For example, in a heterogeneous environment, a high end primary platform, such as an IBM AIX server, may be coupled with a more cost effective standby platform, such as a Linux server.

Transaction terminator 220 terminates transactions on the primary database server, where the transactions are originated from client applications (e.g., client applications 124). In an embodiment, a transaction is a unit of work performed within a database management system that maintains database consistency and allows correct recovery in cases of system failure. A transaction may further provide isolation between programs accessing a database concurrently.

In an embodiment, transaction terminator 220 can deactivate the primary database server, and the primary database server can be placed in an inactive state via a termination of transaction activities.

Log drainer 230 drains transaction logs of the primary database server 304, where the transaction logs are replicated from the primary database server to the standby database servers. In an embodiment, draining the transaction logs of the primary database server includes pushing the transaction logs from the primary database server to the replication server. For example, the changes captured in the transaction logs since the last synchronization is transferred to the replication server and the changes are applied to the standby database servers. Upon the completion of the draining the transaction logs, the primary database may be in sync with the standby database server.

In an embodiment, before the failover occurs, the transaction logs are transferred from primary database server to standby database server using asynchronous replication. In an embodiment, when primary database server is in an active state and client applications connect to primary database server, the transactions may be committed and confirmed by primary database server, without waiting for transaction logs to be transferred to standby database server. Thus, the transaction logs on primary database server may not be always in sync with those on standby database server. Given that in a warm state, the transaction logs maybe out of sync, and they are transferred when possible, there is no guaranty that when failover initiates, the client application can immediately connect to a new primary database server to process transactions. In a hot state, primary database server can confirm transactions after the transaction logs have been replicated from primary database server to the companion database servers.

In an embodiment, when the primary database server is in a log drain state, the synchronization occurs between primary database server and standby database server. Upon the completion of the synchronization process, the transaction logs have been transferred from primary database server to standby database server. Still alternatively, the changes captured in the transaction logs of the primary database server since a last replication, may be transferred from the primary database server to the replication server, which in turn transferred to the standby database servers. As noted, at the end of the "log drain" state, the primary database server and the standby database servers are in sync.

Server designator 240 designates the standby sever from multiple standby servers as a new primary database server, after the transaction logs have been transferred to standby database server. In an embodiment, a standby database server which is geographically closest to primary database server may be selected from the standby database servers, and designated as the new primary database server. Alternatively, a standby database server may be selected from multiple standby database servers and designated as the new primary database server, regardless of its geographical proximity to primary database server. In an embodiment, the selected standby database server is promoted to the new primary database server, and the old primary database server is demoted to a standby database server. The direction of replication and transaction log synchronization may be changed from the new primary database server to the standby database servers, including the standby database which was newly demoted from the previous primary database server. In an embodiment, HADR system supports seamless application failover from the primary database server to a standby database server. For example, transaction terminator 220, log drainer 230 and server designator 240, alone or in combination, implement a transaction quiesce or deactivation mechanism as discussed above to support the seamless failover.

HADR system 115 can include a transaction resumer to resume transaction processing of client applications by the new primary database server.

HADR system 115 can include a server demoter to demote the primary database server to a standby database server. HADR system 115 can include a replication reverser to change the direction of replication from the new primary database server to the demoted primary database server.

HADR system 115 can include a failover performer to perform failover from the primary database server to the companion server or from the primary database server to a selected standby database server.

Figure 3:
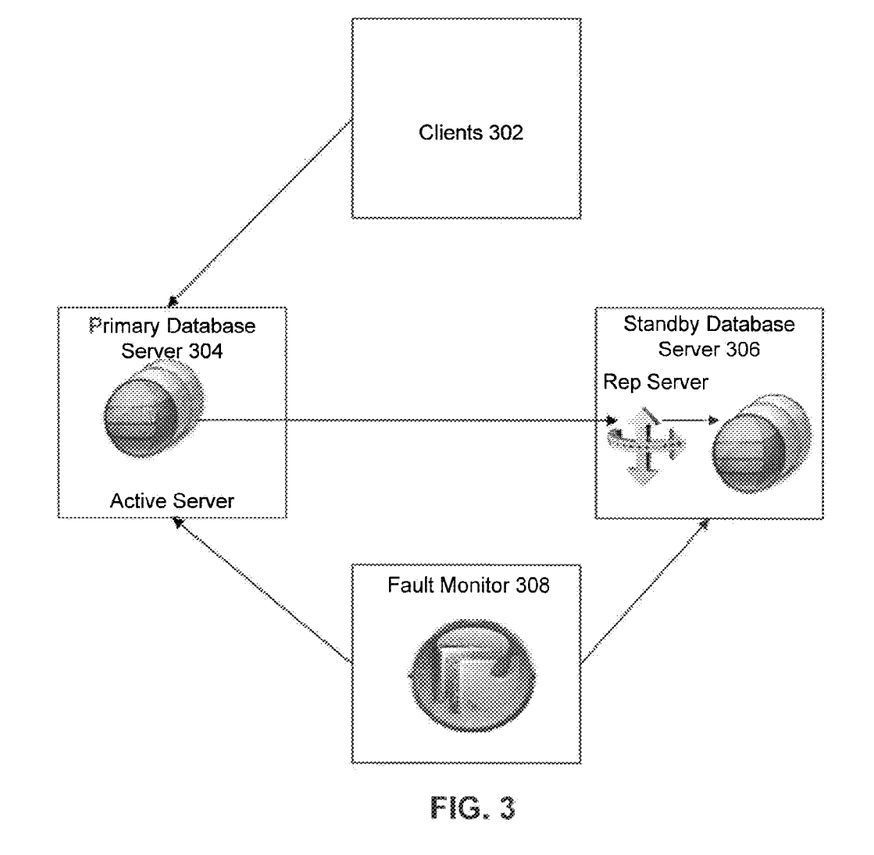
FIG. 3 illustrates an example HADR system, according to an embodiment.

FIG. 3 illustrates an example HADR system, according to an embodiment. In this example, primary database server 304 is logically connected with standby database server 306. The standby database server 306 can include a replication server 305 that replicates data from the primary database server 304 to the standby database server 306 asynchronously. In operation, primary database server 304 can be in an active state and can process transactions originated from client 302, and the standby database server 306 does not accept any transactions. Client 302 may send transaction requests to primary database server 304 via a dispatcher and an Open Database Connectivity (ODBC) layer (not illustrated).

In an embodiment, fault monitor 308 serves as a dashboard that monitors the health of primary database server 304 and sends out alerts when primary database server 304 becomes unavailable. In the event a server failure is detected at primary database server 304, fault monitor 308 can initiate a failover process to failover from the primary database server 304 to one of the standby database servers or companion database servers. In an embodiment, primary database server 304 and standby database server 306 have a database control component (not shown) which receives the command from fault monitor 308 and controls the flow of the failover process.

In an embodiment, upon receiving a command (e.g., deactivate command) to initiate the failover process, the primary database server 304 stops accepting new transactions from client 302, and allows existing transactions to complete within a timeout period. At the end of the timeout period, the existing transactions, which are not completed, may be terminated or killed. Alternatively, the deactivation process may fail upon timeout and the primary database server is restored to the active state. Thus, upon the successful completion of the deactivation there are no more new transactions and no existing transactions executing on primary database server 304.

Figure 4:
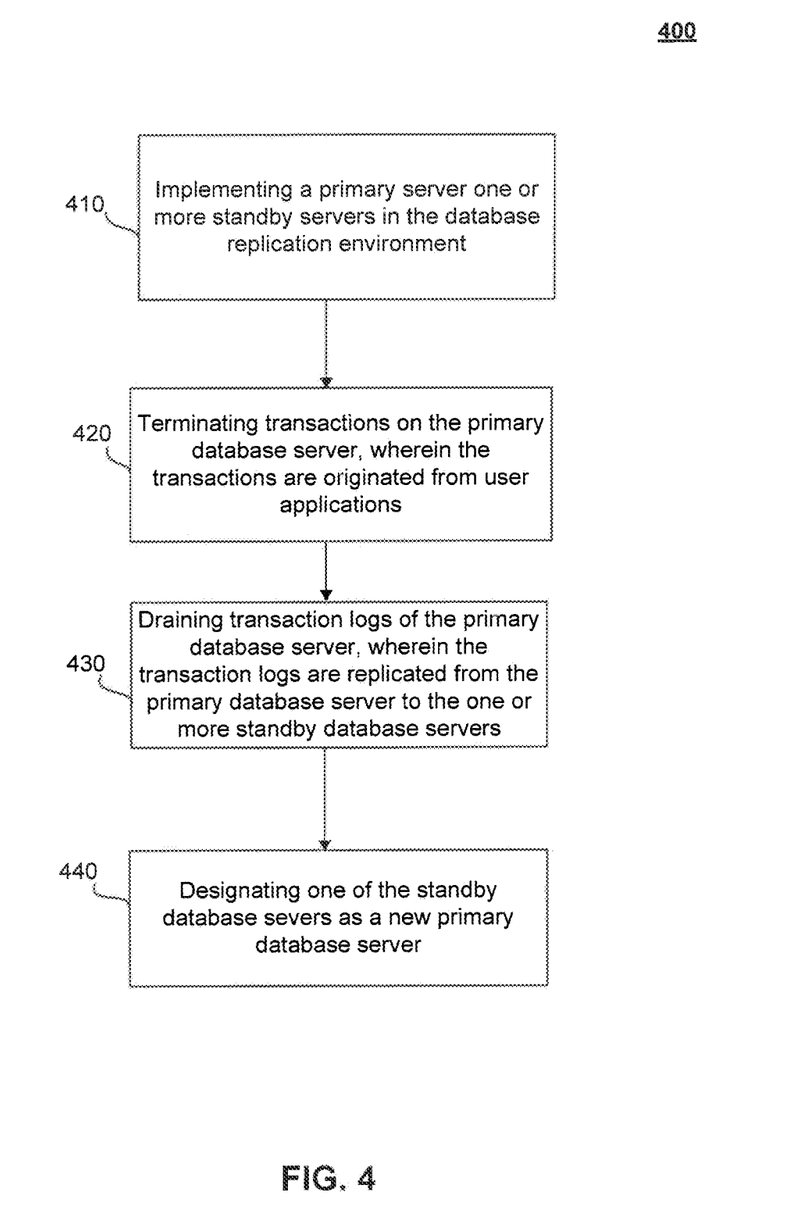
FIG. 4 is a flowchart for a method for seamless failover between a primary database server and a standby database server, according to an embodiment.

FIG. 4 is a flowchart for a method for seamless failover between a primary database server and a standby database server, according to an embodiment. For ease of explanation, method 400 will be described with respect to HADR 115 in FIG. 2, as described above. However, method 400 is not limited thereto.

Optionally, at stage 410, a primary database server and a plurality of standby database servers are implemented in the database replication environment. For example, server implementer 210 implements a primary database server and a plurality of standby database servers in the database replication environment. In an embodiment, the primary database server and the plurality of standby database servers conduct asynchronous replication. The primary database server and the plurality of the standby database servers may be geographically remote. Alternatively, a companion database server may be implemented, with the companion database server being geographically close to the primary database server, according to one embodiment. In another embodiment, the companion database server is geographically located anywhere in the network relative to the primary database server. In this configuration including a companion database server, the primary database server and the companion database server may engage in synchronous data replication. In operation, the primary database server services transaction processing of client applications. Any transaction requests originated from the client applications may be re-directed to the primary database server. For example, in the event a transaction request is received at one of the standby database servers, the request is re-directed to the primary database server.

In an embodiment, a set of replication servers may provide asynchronous replication from the primary database server to a plurality of standby database servers. Alternatively, a replication servers may provide synchronous replication from the primary database server to a companion server. In an embodiment, the replication servers may reside on the primary database server, the companion database server, and/or standby database servers. The replication servers may also reside on a host remote to the primary database server, the companion database server, and/or standby database servers.

In an embodiment, a database connecting to a primary database server is partially or entirely replicated to databases connecting to the standby database servers. At any given time, only one primary sever may exist in the server cluster, according to an embodiment. In normal operation when the primary database server is in an active state the transaction activities by client applications are allowed to be connected and processed by the primary database server.

In an embodiment, ordinary users (i.e., users without privilege or administrator credentials) are not permitted to access to the standby database servers and they may only access to a primary database server that is in an active state. Optionally, a privileged user may login and submit transactions for processing on the primary database server and the standby database servers. For example, the role of a privileged user may be granted to an administrator or a maintenance user during configuration of the server cluster. The privileged user may not modify access rights of its owner with respect to databases. A privileged user may initiate privileged connections to the primary database server or the standby database server. The standby database servers may be in an inactive state, where no transaction activity is allowed by non-privileged ordinary connections.

In an embodiment, the primary database server, the companion database server, and standby database servers are configured dynamically, affording flexibility to add a new database server to the cluster as needed and change the topology to meet changing requirement of the business applications. There may be no geographic location restriction for the database servers (e.g., primary database server, standby database server, companion database server) in the cluster.

At stage 420, transactions on the primary database server are terminated, where the transactions are originated from client applications (e.g., client applications 124 in FIG. 1). For example, transaction terminator 220 terminates transactions on the primary database server in response to a deactivation command. In an embodiment, transactions on the primary database server are terminated via a deactivation command, and the primary database server is put in an inactive state.

In an embodiment, stage 420 may be referred as "deactivating" stage, during which transaction activities by non-privileged connections are terminated. The duration of this stage may be specified by a timeout. If an inactive state is not reached upon expiration of the timeout, the state of the primary database server may be rolled back to an active state or be forcibly advanced to an inactive state, depending on the specification of the administrator. For example, an ongoing transaction originated from a privileged connection upon timeout may preclude an inactive state of the primary database server to be reached. In another example, such an ongoing transaction from a privileged connection may be aborted.

In an embodiment, while the ongoing transactions by privileged connections and non-privileged connections are allowed to continue up to the specified timeout, no new transactions by non-privileged connections are allowed. However, privileged connections may still be allowed to start new transactions when the primary database server is in an inactive state. Once an inactive state of the primary database server is reached, a "log drain" stage may be invoked, as illustrated below.

At stage 430, transaction logs of the primary database server are drained, and the transaction logs are replicated from the primary database server to the plurality of standby database servers. Upon the completion of the draining of the transaction logs, the primary database server and the standby servers are in sync. For example, log drainer 230 drains transaction logs of the primary database server. In an embodiment, changes captured in the transaction logs of the primary database server are applied to those of the standby database servers. In an embodiment, the transactions logs are transferred from the primary database server to the replication server, which in turn are transferred to the standby database servers. Alternatively, transactions logs may be transferred from the primary database server to the companion database server directly or indirectly.

In an embodiment, the primary database server may still be in an inactive state while its transaction logs are being drained. Thus, privileged connections may still be allowed to conduct transaction activities in the "log drain" stage. An interface may be invoked internally during the deactivation process once an inactive state has been reached on the primary database server. For example, an interface may be offered to monitor the progress of draining of transaction logs on the primary database server and the status of replication of the transaction logs on the specific standby database server.

At stage 440, one of the standby database servers is designated as a new primary database server. For example, server designator 240 designates one of the standby database servers as a new primary database server. In an embodiment, after the draining of transaction logs is complete at stage 430, the primary database server may be reduced to a standby database server. In another example, the primary database server may be restored to an active state to resume normal operations.

In an embodiment, the primary database server is reduced to a standby database server and transaction processing of user applications is resumed by the new primary database server, which accepts user connection requests and processes user transactions. In an embodiment, the original primary database server is demoted to be a member of the plurality of the standby database servers. For example, a non-privileged connection request to a standby database server may be silently redirected to the primary database server. In an embodiment, the direction of replication may be changed. For example, the transaction logs synchronization is originated from the new primary database server to the standby database servers, including the newly demoted primary database server, which is now acting as a standby database server.

After the failover, in an embodiment, some connection specific attributes may be restored. For example, when a user visits an online shopping site and selects a product into the shopping cart. If the primary database goes down and fails over to a standby database server, this process may be transparent to the user. The user may not need to re-login or re-select the product into the shopping cart. Such connection specific attributes may be restored via a connection context, including, such as parameters indicating which database to use, isolation level, prepared statement for the query to be executed, etc.

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
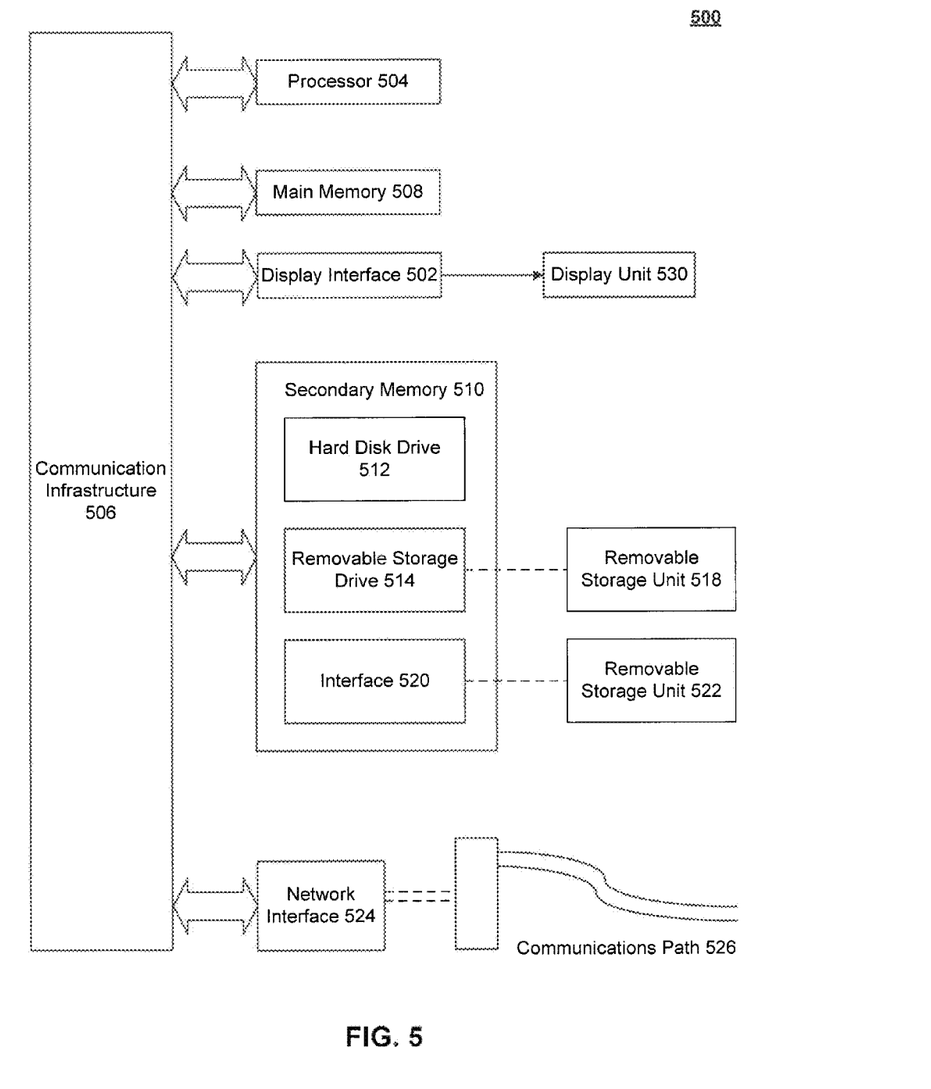
FIG. 5 is a diagram of an example computer system in which embodiments can be implemented.

FIG. 5 illustrates an example computer system 500 in which embodiments, or portions thereof, may be implemented as computer-readable code. For example, HADR 115, including their components, as shown in FIGS. 2 and 4, can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments of the present invention, such as the stages in the methods illustrated by flowcharts 400 and 500 of FIGS. 4 and 5, discussed above. Accordingly, such computer programs represent controllers of the computer system 500. Where embodiments are implemented using software, the software may be stored in a computer program product and loaded into computer system 500 using removable storage drive 514, interface 520, and hard disk drive 512, or network interface 524.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "an embodiment," "one embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for seamless failover in a database replication environment comprising a primary database server and a standby database server, the method comprising:
   terminating transactions on the primary database server, wherein the terminating puts the primary database server in an inactive state and the transactions originate from client applications;
   draining transaction logs of the primary database server based on the terminating, wherein the transaction logs are replicated from the primary database server to the standby database server; and
   designating the standby database server as a new primary database server.

2. The method of claim 1, wherein the primary database server and the standby database server conduct asynchronous replication.

3. The method of claim 1, wherein the primary database server services transaction processing of the client applications.

4. The method of claim 1, further comprising:
   receiving connection requests from the client applications to the standby database server; and
   redirecting the connection requests to the primary database server.

5. The method of claim 1, wherein the primary database server and the standby database server reside on different platforms or platforms with different versions.

6. The method of claim 1, further comprising:
   resuming transaction processing of the client applications by the new primary database server.

7. The method of claim 1, wherein the terminating comprises:
   deactivating the primary database server via a deactivate command.

8. The method of claim 1, wherein the primary database server and the standby database server are geographically remote.

9. The method of claim 1, further comprising:
   demoting the primary database server to the standby database server; and
   changing a direction of replication from the new primary database server to the demoted standby database server.

10. The method of claim 1, further comprising:
    performing failover from the primary database server to a companion database server, wherein the companion database server is geographically close to the primary database server, and the primary database server and the companion database server implement synchronous data replication.

11. A system for seamless failover in a database replication environment comprising a primary database server and a standby database server, the system comprising:
    a memory; and
    at least one processor coupled to the memory and configured to execute a plurality of modules, the modules comprising:
       a transaction terminator, configured to terminate transactions on the primary database server, wherein the terminating puts the primary database server in an inactive state and the transactions originate from client applications,
       a log drainer, configured to drain transaction logs of the primary database server based on the terminating, wherein the transaction logs are replicated from the primary database server to the one or more standby database servers, and
       a server designator, configured to designate the standby database server as a new primary database server.

12. The system of claim 11, wherein the primary database server and the standby database server conduct asynchronous replication.

13. The system of claim 11, wherein the primary database server services transaction processing of the client applications.

14. The system of claim 11, further comprising:
    a connection receiver, configured to receive connection requests from the client applications to the standby database server, and
    a connection redirector, configured to redirect the connection requests to the primary database server.

15. The system of claim 11, wherein the log drainer is configured to:
    apply changes captured in the transaction logs of the primary database server to the standby database server.

16. The system of claim 11, further comprising:
    a transaction resumer, configured to resume transaction processing of the client applications by the new primary database server.

17. The system of claim 11, wherein the transaction terminator is configured to:
    deactivate the primary database server via a deactivate command.

18. The system of claim 11, wherein the primary database server and the standby database server are geographically remote.

19. The system of claim 11, further comprising:
    a server demoter, configured to demote the primary database server to the standby database server; and
    a replication reverser, configured to change a direction of replication from the new primary database server to the demoted standby database server.

20. A tangible computer readable storage medium having instructions encoded thereon, execution of which, by a processor, cause the processor to perform operations for seamless failover in a database replication environment comprising a primary database server and database server, the operations comprising:
    terminating transactions on the primary database server, wherein the terminating puts the primary database server in an inactive state and the transactions originate from client applications;
    draining transaction logs of the primary database server based on the terminating, wherein the transaction logs are replicated from the primary database server to the standby database server; and
    designating the standby database server as a new primary database server.

* * * * *